United States Patent
Kawamura (10) Patent No.: US 12,355,086 B2
(45) Date of Patent: Jul. 8, 2025

(54) CATALYST LAYER

(71) Applicant: TOPPAN INC., Tokyo (JP)

(72) Inventor: Atsuhiro Kawamura, Tokyo (JP)

(73) Assignee: TOPPAN INC., Tokyo (JP)

( * ) Notice: Subject to any disclaimer, the term of this patent is extended or adjusted under 35 U.S.C. 154(b) by 431 days.

(21) Appl. No.: 17/858,213

(22) Filed: Jul. 6, 2022

(65) Prior Publication Data
US 2022/0352525 A1    Nov. 3, 2022

Related U.S. Application Data

(63) Continuation of application No. PCT/JP2021/000630, filed on Jan. 12, 2021.

(30) Foreign Application Priority Data

Jan. 9, 2020    (JP) ................. 2020-002386

(51) Int. Cl.
| | |
|---|---|
| *H01M 4/86* | (2006.01) |
| *H01M 4/88* | (2006.01) |
| *H01M 4/92* | (2006.01) |
| *H01M 8/10* | (2016.01) |

(52) U.S. Cl.
CPC ....... *H01M 4/8663* (2013.01); *H01M 4/8652* (2013.01); *H01M 4/88* (2013.01); *H01M 4/926* (2013.01); *H01M 8/10* (2013.01); *H01M 2008/1095* (2013.01)

(58) Field of Classification Search
CPC ....... H01M 2008/1095; H01M 4/8605; H01M 4/8652; H01M 4/8663; H01M 4/8673; H01M 4/88; H01M 4/926; H01M 8/10; Y02E 60/50

See application file for complete search history.

(56) References Cited

U.S. PATENT DOCUMENTS 7,858,266 B2 * 12/2010 Fly ................. H01M 4/8828
                                                                429/530
2008/0038615 A1    2/2008 Son

FOREIGN PATENT DOCUMENTS

| JP | 2006-134836 A | 5/2006 |
|---|---|---|
| JP | 2006-172865 A | 6/2006 |

OTHER PUBLICATIONS

Office Action issued in corresponding European Patent Application No. 21738231.6 dated Oct. 15, 2024 (6 pages).
Extended European Search Report issued in connection with EP Appl. Ser. No. 21738231.6 dated Apr. 5, 2023.
Nechitailov A A et al: "Structure Formation Model in the Pt/C-CNT-Nafion System", Journal of Structural Chemistry, Pleiades Publishing, Moscow, vol. 60, No. 9, Sep. 1, 2019 (Sep. 1, 2019), pp. 1507-1519, XP036898844, ISSN: 0022-4766.

* cited by examiner

*Primary Examiner* — Victoria H Lynch
(74) *Attorney, Agent, or Firm* — Foley & Lardner LLP (57) ABSTRACT

A cathode catalyst layer and an anode catalyst layer used for a membrane-electrode assembly in a polymer electrolyte fuel cell, wherein the cathode catalyst layer and the anode catalyst layer each include catalyst particles, a conductive carrier, a polymer electrolyte, and a fibrous material, the fibrous material includes at least one of an electron conductor and a proton conductor, and the fibrous material has a specific surface area in a range of 40 m²/g or more and 80 m²/g or less.

2 Claims, 3 Drawing Sheets

CATALYST LAYER

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/000630, filed on Jan. 12, 2021, which in turn claims the benefit of JP 2020-002386, filed Jan. 9, 2020 the disclosures of all which are incorporated herein by reference in its entirety.

TECHNICAL FIELD

The present invention relates to a catalyst layer in a polymer electrolyte fuel cell.

BACKGROUND

In recent years, there has been a demand for development of novel energy sources allowing for $CO_2$ reduction in order to solve environmental problems such as global warming. As one of such energy sources, fuel cells not emitting $CO_2$ have been attracting attention.

A fuel cell oxidizes a fuel (e.g. hydrogen) using an oxidizer (e.g. oxygen) to generate harmless water. Such a fuel cell can convert chemical energy obtained by generating water into electrical energy and thus can be used as a power source.

Fuel cells are classified by the type of an electrolyte used. As major fuel cells, there are known polymer electrolyte fuel cells, phosphoric acid fuel cells, molten-carbonate fuel cells, solid oxide fuel cells, alkaline electrolyte fuel cells, and the like. Phosphoric acid fuel cells and alkaline electrolyte fuel cells use an electrolyte obtained by impregnating a separator such as nonwoven cloth with a phosphoric acid aqueous solution or alkaline aqueous solution. The polymer electrolyte fuel cells and the solid oxide fuel cells use a solid electrolyte such as a polymer film or a ceramic sheet.

The appropriate operating temperature of the fuel cells varies depending on the electrolyte used. For example, for solid oxide fuel cells and molten-carbonate fuel cells, the operating temperature of the electrolyte is about 200° C. to 700° C. Thus, these cells are difficult to reduce in size and weight but are suited for high-output power generation systems. Therefore, these cells are suitably used as replacement cells at small- or medium-scale power generation plants installed in isolated islands or distant places or at old thermal power generation plants.

On the other hand, polymer electrolyte (membrane) fuel cells (PEFCs) have the properties of low-temperature operation and high-output density and are capable of size and weight reduction. Thus, these fuel cells have been being developed as domestic power sources or in-vehicle power sources.

Polymer electrolyte fuel cells (PEFCs) have a structure (membrane-electrode assembly) in which a polymer electrolyte membrane is sandwiched between a fuel electrode (anode) and an air electrode (cathode), and supply hydrogen gas as a fuel gas to the fuel electrode and supply an air gas including oxygen to the air electrode to generate electric power by chemical reaction as follows:

Anode: $H_2$ to $2H^+ 2e^-$          (reaction 1)

Cathode: $\frac{1}{2}O_2 + 2H^+ 2e^-$ to $H_2O$          (reaction 2)

The anode and the cathode are each formed of a laminated structure of a catalyst layer and a gas diffusion layer.

Protons (hydrogen ions) and electrons are generated from the hydrogen gas supplied to the anode-side catalyst layer by chemical reaction with the electrode catalyst (reaction 1). The generated protons migrate from the polymer electrolyte in the anode-side catalyst layer through a polymer electrolyte membrane to the cathode. The generated electrons pass through an external circuit and migrate to the cathode.

In the cathode-side catalyst layer, the protons, the electrons, and the oxygen contained in the externally supplied air react to generate water (reaction 2).

For cost reduction of the polymer electrolyte fuel cell, there is an issue of reducing the usage of platinum that is highest in cost among the cell materials. However, reducing the usage of platinum that plays a key role in the chemical reaction of the fuel cell would result in degradation of output characteristics and durability of the fuel cell.

In order to solve the issue with reduction of the usage of platinum, for example, there is disclosed a technique for improving electron conductivity by using carbon fibers for a carbon carrier (see PTL 1).

PTL 1 describes that, as a catalyst carrier, using carbon fibers with carbon particles fixed to the surface, instead of conventional carbon particles, would achieve improved conductivity that leads to higher output.

However, along with the increase of output, water is generated in the cathode-side catalyst layer, and it is necessary to drain the water from the porous catalyst layer. That is, in order to obtain high output, it is essential to provide a mechanism for actively draining the water generated in the cathode-side catalyst layer. PTL 1 describes the improvement of output in a low-current density region in examples but does not describe a high-current density region.

CITATION LIST

Patent Literature

[PTL 1]
   JP 2006-172865 A.

SUMMARY OF THE INVENTION

Technical Problem

The present invention is made in view of circumstances as described above. An issue to be solved by the present invention is to provide a catalyst layer that is improved in power generation performance even in a high-output region (high current density region).

Solution to Problem

As a solution to the above-described issue, a catalyst layer according to an aspect of the present invention is a catalyst layer that is used for a membrane-electrode assembly in a polymer electrolyte fuel cell. The catalyst layer includes a catalyst particle, a conductive carrier, a polymer electrolyte, and a fibrous material. The fibrous material includes at least one of an electron conductor and a proton conductor. The fibrous material has a specific surface area in a range of 40 $m^2/g$ or more and 80 $m^2/g$ or less.

The catalyst layer according to the aspect of the present invention preferably has a peak Dp, of a distribution function dVp/d log D of a pore volume Vp to a pore diameter D in the catalyst layer, in a range of 0.06 μm or more and 0.10 μm or less.

The catalyst layer according to the aspect of the present invention preferably has a full width at half maximum at the peak Dp of the distribution function dVp/d log D in a range of 0.13 μm or more and 0.18 μm or less.

The catalyst layer according to the aspect of the present invention preferably has an average fiber length of the fibrous material in a range of 3 μm or more and 50 μm or less.

The catalyst layer according to the aspect of the present invention preferably has an average fiber diameter of the fibrous material in a range of 50 nm or more and 400 nm or less.

Advantageous Effects of the Invention

According to the catalyst layer in the aspect of the present invention, it is possible to provide a catalyst layer for polymer electrolyte fuel cells that has improved mass transfer and provides high power generation performance. That is, according to the catalyst layer in the aspect of the present invention, it is possible to provide a catalyst layer that is improved in power generation performance even in a high-output region (high current density region) (that is, have power generation performance maintained at a level equivalent to that in a low-current density region).

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

An embodiment of the present invention will be described with reference to FIGS. 1 to 3B. It should be noted that the present invention is not limited to the following embodiment. Design modifications can be made on the basis of the knowledge of the person skilled in the art, and such modifications are also included in the scope of the present invention.

<Catalyst Layer>

A catalyst layer for polymer electrolyte fuel cell according to an embodiment of the present invention will be described.

The catalyst layer according to the embodiment of the present invention is a catalyst layer that is used for a membrane-electrode assembly in a polymer electrolyte fuel cell.

The catalyst layer according to the embodiment of the present invention includes catalyst particles, a conductive carrier, a polymer electrolyte, and a fibrous material.

The fibrous material includes at least one of an electron conductor and a proton conductor. The fibrous material has a specific surface area in a range of 40 m²/g or more and 80 m²/g or less.

The catalyst layer according to the embodiment of the present invention preferably has a peak Dp of a distribution function dVp/d log D of a pore volume Vp to a pore diameter D in the catalyst layer in a range of 0.06 μm or more and 0.10 μm or less.

The catalyst layer according to the embodiment of the present invention preferably has the full width at half maximum of the peak Dp of the distribution function dVp/d log D of the pore volume Vp to the pore diameter D in the catalyst layer in a range of 0.13 μm or more and 0.18 μm or less.

The fibrous material included in the catalyst layer according to the embodiment of the present invention preferably has an average fiber length in a range of 3 μm or more and 50 μm or less.

The fibrous material included in the catalyst layer according to the embodiment of the present invention preferably has an average fiber diameter in a range of 50 nm or more and 400 nm or less.

Next, an embodiment of the present invention will be described in detail with reference to FIGS. 1 and 2.

Figure 1:
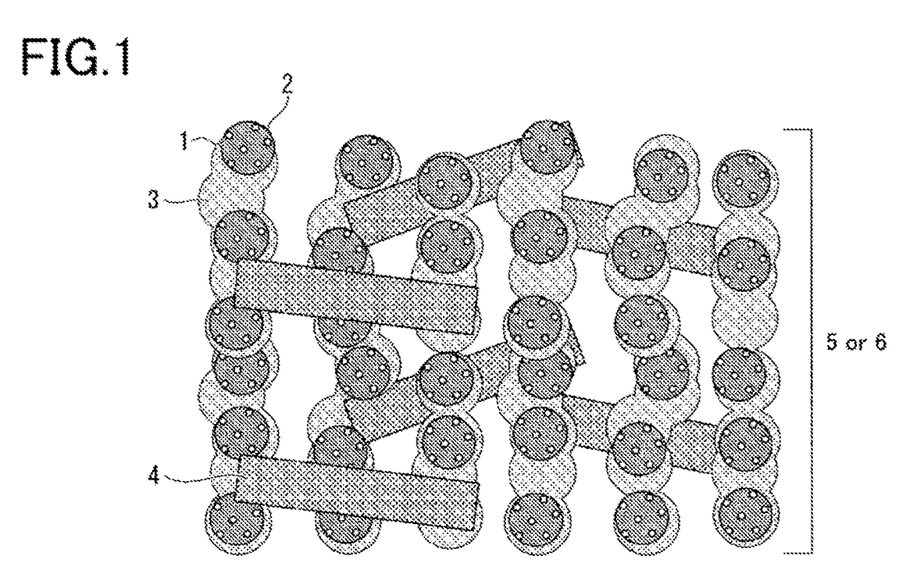
FIG. 1 is an explanatory cross-sectional view of an internal structure of a catalyst layer for polymer electrolyte fuel cell according to an embodiment of the present invention.

FIG. 1 is an explanatory cross-sectional view of an internal structure of a catalyst layer for an polymer electrolyte fuel cell that is an embodiment of the present invention, the catalyst layer including catalyst particles 1, a conductive carrier 2, a polymer electrolyte 3, and a fibrous material 4.

Figure 2:
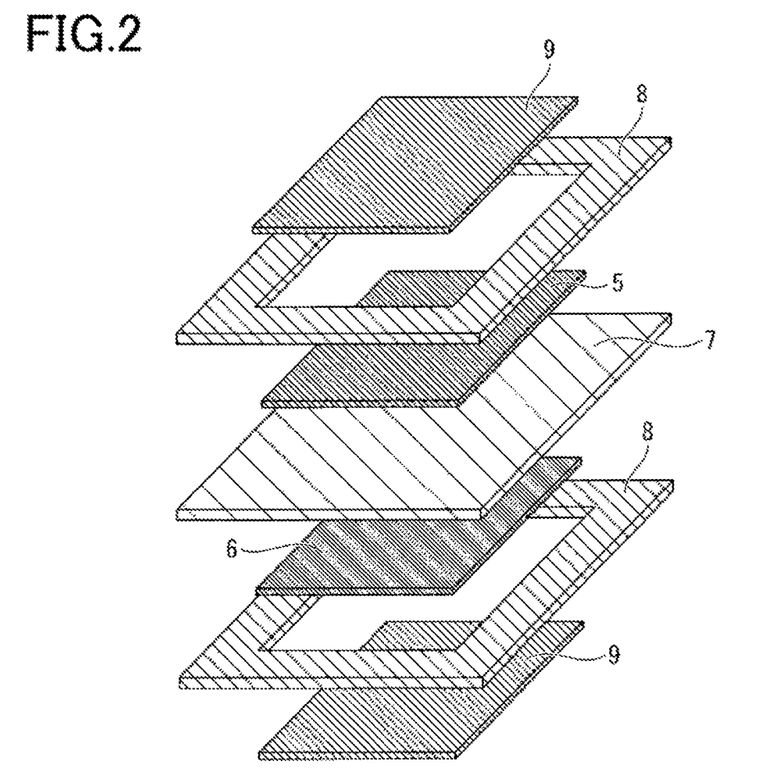
FIG. 2 is an explanatory overhead view of an example of a layer configuration of a membrane-electrode assembly of the present invention.

FIG. 2 is an explanatory overhead view of a layer configuration of a membrane-electrode assembly that is an embodiment of the present invention, the membrane-electrode assembly including a cathode catalyst layer 5, an anode catalyst layer 6, a polymer electrolyte membrane 7, a gasket material 8, and a gas diffusion layer 9. Hereinafter, the cathode catalyst layer 5 and the anode catalyst layer 6 will also be called "catalyst layer" for the sake of convenience.

In the present embodiment, the membrane thickness of the cathode catalyst layer 5 may be the same as or larger than the membrane thickness of the anode catalyst layer 6. If the membrane thickness of the cathode catalyst layer 5 is larger than the membrane thickness of the anode catalyst layer 6, the membrane thickness of the cathode catalyst layer 5 is preferably in a range of 1.1 times or more and 2 times or less, more preferably, in a range of 1.3 times or more and 1.7 times or less the membrane thickness of the anode catalyst layer 6. When the membrane thickness of the cathode catalyst layer 5 is in the above-mentioned numerical range, it is possible to reduce degradation of proton conductivity while securing drainage properties, thereby maintaining high output characteristics.

Next, a configuration of the catalyst layer according to the embodiment of the present invention will be described with reference to FIG. 1.

(Catalyst Particles)

The catalyst particles 1 used in the present embodiment may be platinum group elements such as platinum, palladium, ruthenium, iridium, rhodium, and osmium; metals such as iron, lead, copper, chromium, cobalt, nickel, manganese, vanadium, molybdenum, gallium, and aluminum; and alloys thereof. In addition, the catalyst particles 1 may be an oxide or composite oxides of the above-mentioned substances. The average diameter of the catalyst is, for example, in a range of 0.1 nm or more and 1 μm or less, preferably in a range of 0.5 nm or more and 100 nm or less, and further preferably in a range of 1 nm or more and 10 nm or less. When the average diameter of the catalyst particles 1 is in the above-mentioned numerical range, catalytic reaction progresses at high efficiency.

(Conductive Carrier)

The conductive carrier 2 supporting these catalyst particles 1 is generally carbon particles. The carbon particles may be of any type as long as they are fine-grained and electrically conductive and are not affected by the catalyst particles 1. Examples of the types of the carbon particles include carbon black, graphite, black lead, activated charcoal, and fullerene. In order to improve the ability to support the catalyst particles 1, the conductive carrier 2 is preferably a porous material.

(Polymer Electrolyte)

The polymer electrolyte 3 used in the present embodiment may be made from the same material as the polymer electrolyte membrane 7 as long as the material has proton conductivity. Examples of the polymer electrolyte 3 include fluorine-based polymer electrolyte and hydrocarbon-based polymer electrolyte. The fluorine-based polymer electrolyte may be a Nafion (registered trademark)-type material produced by DuPont de Nemours, Inc. or the like.

(Composition of Catalyst Layer)

The ratio of mass C of the conductive carrier 2 supporting the catalyst particles 1 and mass FS of the fibrous material 4 to mass I of the polymer electrolyte 3 (I/(C+FS)) is preferably in a range of 0.2 or more and 1.5 or less. If the ratio of these components (I/(C+FS)) is less than 0.2, the proton path may become sparse and power generation performance of the fuel cell may significantly deteriorate. If the ratio of these components I/(C+F) exceeds 1.5, the drainage properties of the catalyst layer may decrease and significantly deteriorate the power generation performance of the fuel cell.

The ratio of mass FS of the fibrous material 4 to the mass C of the conductive carrier 2 supported by the catalyst particles 1 (FS/C) is preferably in a range of 0.05 or more and 1.20 or less. In particular, the mass ratio between the conductive carrier 2 and the fibrous material 4 (FS/C) is preferably in a range of 0.1 or more and 1.0 or less, so that the pore volume in the catalyst layer required for mass transfer is extended to suppress performance degradation. On the other hand, if the mass ratio between the conductive carrier 2 and the fibrous material 4 (FS/C) exceeds 1.20, flooding may occur and significantly deteriorate the power generation performance of the fuel cell. Otherwise, if the mass ratio between the conductive carrier 2 and the fibrous material 4 (FS/C) is less than 0.05, the pore volume in the catalyst layer required for mass transfer may become small to significantly deteriorate the power generation performance of the fuel cell.

The density of the catalyst particles 1 supported by the conductive carrier 2 is in a range of 15 wt % or more and 80 wt % or less, preferably in a range of 20 wt % or more and 70 wt % or less. If the density of the supported catalyst particles 1 is less than 15 wt %, the active sites in the entire catalyst layer may decrease due to lack of the catalyst particles 1, thereby causing performance degradation. Otherwise, if the density of the supported catalyst particles 1 exceeds 80 wt %, the catalyst particles 1 may aggregate so that dissolution and precipitation of the catalyst particles 1 during power generation are promoted which degrades durability.

(Fibrous Material)

The fibrous material 4 used in the present embodiment may be conductive (electron conductive) carbon fibers (electron conductors) such as carbon fibers, carbon nanofibers, and carbon nanotube, or polymer-based proton-conductive fibrous materials (proton conductors) such as sulfonated polyether ketone, sulfonated polyether sulfone, sulfonated polyether ether sulfone, sulfonated polysulfide, sulfonated polyphenylene, sulfonated polyimide, and acid-doped polybenzoazoles.

The average fiber diameter of the fibrous material 4 is preferably in a range of 50 nm or more and 400 nm or less. Setting the average fiber diameter of the fibrous material 4 in the above-mentioned numerical range increases the voids in the catalyst layer and provides high power generation performance.

The average fiber length of the fibrous material 4 is preferably in a range of 3 μm or more and 50 μm or less. Setting the average fiber length of the fibrous material 4 in the above-mentioned numerical range allows the fibrous material 4 to reinforce the skeleton of the catalyst layer so that the voids in the catalyst layer are expanded, to provide high power generation performance.

The average fiber diameter and average fiber length of the fibrous material 4 can be measured and evaluated by a scanning electron microscope or a transmission electron microscope. Specifically, the average fiber diameter and average fiber length of the fibrous material 4 according to the present embodiment are determined by measuring the fiber diameters and fiber lengths of 100 randomly extracted pieces of fibrous material 4 using a scanning electron microscope or a transmission electron microscope and then averaging the measurement values.

The specific surface area of the fibrous material 4 is in a range of 10 m$^2$/g or more and 100 m$^2$/g or less. In particular, the specific surface area of the fibrous material 4 is preferably in a range of 40 m$^2$/g or more and 80 m$^2$/g or less. When the specific surface area of the fibrous material 4 is in the above-mentioned numeric range, the polymer electrolyte 3 will not become entangled with the fibrous material 4 so that it is possible to suppress performance degradation without hindering mass transfer. On the other hand, if the specific surface area of the fibrous material 4 exceeds 100 m$^2$/g, the polymer electrolyte 3 will become excessively entangled with the fibrous material 4 so that the pores in the catalyst layer are filled with the aggregates of the polymer electrolyte 3 and fibrous material 4, and significantly decrease the pore volume in the catalyst layer, thereby significantly degrading power generation performance. If the specific surface area of the fibrous material 4 is less than 10 m$^2$/g, the polymer electrolyte 3 will not become entangled with the fibrous material 4 so that the strength of the entire catalyst layer may become insufficient, and the pores in the catalyst layer may easily be crushed. Accordingly, the pore volume in the catalyst layer will greatly decrease and significantly degrade power generation performance.

In the catalyst layer filled with the aggregates, a peak Dp of a distribution function dVp/d log D of a pore volume Vp to a pore diameter D is preferably in a range of 0.06 μm or more and 0.10 μm or less. If the peak Dp of the distribution function dVp/d log D of the pore volume Vp to the pore diameter D is less than 0.06 μm, the proton conductivity is secured but the drainage properties become degraded and the output characteristics tend to slightly decrease. If the peak Dp of the distribution function dVp/d log D of the pore volume Vp to the pore diameter D exceeds 0.10 μm, the drainage performance is secured but the proton conductivity becomes degraded and the output characteristics tend to slightly decrease.

Furthermore, if the distribution function dVp/d log D of the pore volume Vp to the pore diameter D is unimodal but the full width at half maximum at the peak Dp of the distribution function is larger than 0.18 μm or smaller than 0.13 μm, the distribution of the pore diameter D in the catalyst layer is not in an appropriate range and a reaction gas required for power generation is not supplied at a sufficient rate. Thus, the full width at half maximum at the peak Dp of the distribution function dVp/d log D of the pore volume Vp to the pore diameter D is preferably in a range of 0.13 μm or more and 0.18 μm or less.

The above-mentioned specific surface area of the fibrous material 4 can be obtained by BET absorption that is one of gaseous absorption methods. Specifically, the fibrous material 4 is cooled and sprayed with nitrogen gas so that the gas molecules are absorbed on the surface of the fibrous material 4. The amount of gas absorbed by the fibrous material 4 can be calculated by applying the BET equation. Further, the gas absorption amount is multiplied by the cross-section area of one gas molecule to calculate the specific surface area of the fibrous material 4.

Hereinafter, the above-mentioned "pore diameter D", "pore volume Vp", or "distribution function dVp/d log D" will be described.

In the present embodiment, among voids in the catalyst layer, voids with diameters of 3 nm or more and 5.5 μm or less are defined as pores. In the catalyst layer (electrode catalyst layer), the pore diameter D is the pore diameter calculated from the pore volume Vp measured by the mercury intrusion technique. The pore diameter D is defined as the diameter D of a pore that is modeled in a cylindrical form obtained by the mercury intrusion technique. The pore volume Vp is the total value of volumes of pores with certain diameters, which is measured by the mercury intrusion technique.

Here, the distribution of the above-mentioned pore volume Vp will be described. The distribution of the pore volume Vp is represented by the distribution function (=dVp/d log D) of the pore volume Vp to the pore diameter D (3 nm≤D≤5.5 μm) (Log differential pore volume distribution). The distribution of the pore volume Vp can be obtained by the mercury intrusion technique.

Since mercury has high surface tension, it is necessary to apply predetermined pressure P to mercury in order to allow the mercury to enter into the pores. The distribution of the pore volume Vp can be determined from the pressure P applied to allow the mercury to enter into the pores and the amount of mercury intruded into the pores. The relationship between the applied pressure P and the pore diameter D with which mercury can enter under the pressure P is expressed by the following equation (1). In the following equation (1), γ is the surface tension of mercury, and θ is the angle of contact between the mercury and the pore wall surface. In the present embodiment, the pore diameter D is calculated on the assumption that the surface tension γ is 0.48 N/m and the contact angle θ is 130°.

$$D = -4\gamma \cos \theta / P \qquad \text{Equation (1)}$$

In the actual measurement using the mercury intrusion technique, the volumes of mercury intruded under different pressures P are individually recorded. Then, the pressures P are converted into pore diameters D based on the above equation (1). Assuming that the volume of the mercury intruded and the pore volume Vp are equal, a pore volume increase dV that is an increase in the pore volume Vp along with an increase in the pore diameter D to D+dD is plotted with respect to the pore diameter D. The peak of the resultant plot is the peak Dp of the distribution function dVp/d log D of the pore volume Vp to the pore diameter D.

In the present embodiment, if the integrated value of the pore volumes Vp in the entire range of the pore diameters D is designated as first integrated volume and the integrated value of the pore volumes Vp of the pores of which the pore diameters D are 50 nm or less is designated as second integrated volume, the percentage of the second integrated volume to the first integrated volume is preferably 30% or more and 40% or less. In the present embodiment, if the integrated value of the pore volumes Vp of the pores in the range of the integrated volume pore diameters D of 90 nm or more is designated as third integrated volume, the percentage of the third integrated volume to the first integrated volume is preferably 15% or more and 35% or less.

(Solvent)

The solvent used as the dispersion medium of catalyst ink that is ink for forming the catalyst layer is not particularly limited as long as the solvent does not erode the conductive carrier 2 supporting the catalyst particles 1, the polymer electrolyte 3, and the fibrous substance 4, and is capable of dissolving the polymer electrolyte 3 in a highly fluid state or dispersing the polymer electrolyte 3 as fine gel.

The solvent desirably contains a volatile organic solvent and water. Although there is no particular limitation, examples of the organic solvent include alcohols such as methanol, ethanol, 1-propanol, 2-propanol, 1-butanol, 2-butanol, isobutyl alcohol, tert-butyl alcohol, and pentanol, ketone-type solvents such as acetone, methyl ethyl ketone, pentanone, methylisobutyl ketone, heptanone, cyclohexanone, methylcyclohexanone, acetonyl-acetone, and diisobutyl ketone, ether-type solvents such as tetrahydrofuran, dioxane, diethylene glycol dimethylether, anisole, methoxytoluene, and dibutylether, and polar solvents such as other dimethylformamide, dimethylacetamide, N-methylpyrrolidone, ethylene glycol, diethylene glycol, diacetone alcohol, and 1-methoxy-2-propanol. The solvent used may be a mixture of two or more of these solvents and water. The solvent may contain a dispersing agent. The solvents can be mixed or dispersed by using, for example, a ball mill, a bead mill, a planetary mixer, a dissolver, or the like.

<Membrane-Electrode Assembly>

Next, preparation and configuration of the membrane-electrode assembly will be described with reference to FIG. 2.

(Polymer Electrolyte Membrane)

The polymer electrolyte membrane 7 used in the membrane-electrode assembly according to the embodiment of the present invention may be any membrane as long as it has proton conductivity. A fluorine-based polymer electrolyte or a hydrocarbon-based polymer electrolyte can be used. The fluorine-based polymer electrolyte may be Nafion (registered trademark) produced by DuPont de Nemours, Inc. or the like. Examples of the hydrocarbon polymer electrolyte membrane include an electrolyte membrane made of sulfonated polyether ketone, sulfonated polyether sulfone, sulfonated polyether ether sulfone, sulfonated polysulfide, sulfonated polyphenylene, and the like. Among them, a material including perfluorosulfonic acid as fluorine-based polymer electrolyte can be suitably used for the polymer electrolyte membrane 7.

(Gasket Material)

The gasket material 8 and a plastic film (not illustrated) having an adhesive layer are heat resistant to such an extent that they do not melt under thermal pressurization. The gasket material 8 can be a polymer film of polyethylene-naphthalate, polyethylene terephthalate, polyimide, polyamide of parabanic acid, polyamide (nylon), polysulfone, polyethersulfone, polyethersulfone, polyphenylene sulfide, polyether ether ketone, polyether imide, or polyacrylate. The gasket material 8 can be made from a heat-resistant fluororesin such as ethylene tetrafluoroethylene copolymer, tetrafluoroethylene-hexafluoropropylene copolymer, tetrafluoroperfluoroalkyl vinyl ether copolymer, or polytetrafluoroethylene. The base of the gasket material 8 is preferably polyethylene-naphthalate in particular, in consideration of gas barrier properties and heat resistance properties.

(Adhesive Layers)

The adhesive layer for adhering the gasket material 8 and the polymer electrolyte membrane 7, and the adhesive layer in the plastic film (not illustrated), may be made of an acryl-, urethane-, silicone-, or rubber-based adhesive. More preferably, the adhesive layers are made of an acryl-based adhesive in consideration of adhesion between the gasket material 8 and the polymer electrolyte membrane 7, and heat resistance under thermal pressurization. As for the adhesion between the gasket material 8 and the adhesive layer in the plastic film, the adhesion force between the polymer electrolyte membrane 7 and the gasket material 8 is preferably greater than the adhesion force between the gasket material 8 and the plastic film having the adhesive layer, so that the gasket material 8 can be easily added to the membrane-electrode assembly.

Next, methods for producing the catalyst layer and the membrane-electrode assembly will be described.

<Methods for Producing Catalyst Layer and Membrane-Electrode Assembly>

(Dispersion Process of Catalyst Ink)

The catalyst ink according to the present embodiment is an ink for forming the catalyst layer, and includes at least the catalyst particles 1, the conductive carrier 2, the polymer electrolyte 3, the fibrous material 4, and a solvent (dispersion medium).

The dispersion process for producing the catalyst ink can be performed using various apparatuses. Examples of the dispersion process include a process with a ball mill or a roll mill, a process with a shear mill, a process with a wet mill, and an ultrasonic dispersion process. Alternatively, the dispersion process may be conducted using a homogenizer to perform agitation by centrifugal force.

(Coating Process of Catalyst Ink)

Examples of a coating method for forming the catalyst ink on the coating base material include a die coater method, a roll coater method, and a spray method. In the present embodiment, however, there is no limitation on coating method.

The coating base material on which the catalyst layer as a constituent element of the membrane-electrode assembly is formed is the polymer electrolyte membrane 7 or a transfer base material. In the present embodiment, however, there is no limitation on the above base material.

In the case of producing the catalyst layer by the transfer method, the transfer base material may be made of any material as long as the catalyst layer can be formed on the surface thereof and the catalyst layer can be transferred to the polymer electrolyte membrane 7. Examples of the transfer base material include a polymer film of polyimide, polyethylene terephthalate, polyamide of parabanic acid, polyamide (nylon), polysulfone, polyethersulfone, polyethersulfone, polyphenylene sulfide, polyether ether ketone, polyether imide, polyacrylate, or polyethylene-naphthalate. The transfer base material can be made from a heat-resistant fluororesin such as ethylene tetrafluoroethylene copolymer, tetrafluoroethylene-hexafluoropropylene copolymer, tetrafluoroperfluoroalkyl vinyl ether copolymer, and polytetrafluoroethylene.

The membrane-electrode assembly excellent in power generation performance, which is an aspect of the present embodiment, can be obtained by providing the catalyst layer on at least one of an anode side of the polymer electrolyte membrane 7 (that is, the side on which the anode catalyst layer is to be formed) and a cathode side of the polymer electrolyte membrane 7 (that is, the side on which the cathode catalyst layer is to be formed).

According to the method for producing a membrane-electrode assembly described above, it is possible to produce a membrane-electrode assembly in which the catalyst layer is joined in a favorable shape to at least one side (preferably both sides) of the polymer electrolyte membrane 7.

Hereinafter, specific examples of the present invention will be described. However, the present invention is not limited to these examples.

EXAMPLES (Preparation of Catalyst Ink)

Catalyst ink for forming the catalyst layer was prepared by mixing a fluorine-based polymer electrolyte dispersed solution (20% Nafion dispersed solution DE2020 CS type), platinum-supported carbon (TEC10E50E), fibrous material, 1-propanol, and water by a ball mill. The mass ratio between the carbon particles and the polymer electrolyte was set to 1.1. Then, the mixture was subjected to a dispersion process using a planetary ball mill at 300 rpm for 60 minutes. At this time, zirconia balls having a diameter of 5 mm were added to the mixture. The amount of the zirconia balls added was about one-third of the zirconia container. The catalyst ink was prepared as described above.

The catalyst ink was prepared such that the mass of the polymer electrolyte was 100 weight % with respect to the mass of the carbon particles, the mass of the fibrous material was 100 mass % with respect to the mass of the carbon particles, the proportion of the water in the dispersed medium was 50 weight %, and the solid content in the catalyst ink was 10 weight %.

(Formation of Catalyst Layer and Production of Membrane-Electrode Assembly)

An anode catalyst layer and a cathode catalyst layer were formed on the polymer electrolyte membrane by die coating to produce a membrane-electrode assembly. At this time, the polymer electrolyte membrane was coated with the catalyst ink such that the wet membrane thickness of the catalyst ink on the cathode side of the polymer electrolyte membrane was 150 μm and the wet membrane thickness of the catalyst ink on the anode side was 100 μm.

Then, the polymer electrolyte membrane coated with the membranes was placed in a warm-air oven at 80 degrees and dried until the coating membranes become tack free.

In this manner, membrane-electrode assemblies in the examples and comparative examples were obtained.

(Evaluation of Power Generation)

Carbon paper sheets used as gas diffusion layers were sandwiched together in such a manner as to sandwich the membrane-electrode assemblies produced according to the examples 1 to 3 and comparative examples 1 to 3, and the samples were placed in a power generation evaluation cell.

Then, the samples were subjected to current/voltage measurement by a fuel cell measurement device at a cell temperature of 80° C. Flow amount control was performed at a constant utilization rate using hydrogen as a fuel gas and using air as an oxidizing gas.

(Evaluation of dVp/d log D)

The distribution of the pore volume Vp was measured by the mercury intrusion method. Specifically, a membrane-electrode assembly with only the cathode-side electrode catalyst layer formed on the polymer electrolyte membrane was used to measure the pore volume Vp using an automatic porosimeter (AutoPore IV9510 produced by Micromeritics Instrument Corp.) The volume of the measurement cell was approximately 5 cm$^3$, and the pressure of the mercury intrusion was increased from 3 kPa to 400 MPa. Through this process, the amount of mercury intruded at each pressure, that is, the pore volume Vp, was obtained. The pressure of the mercury intrusion was converted to the pore diameter D using Washburn's equation, and a plot of the distribution function dVp/d log D of the pore volume Vp to the pore diameter D was created. At this evaluation, the surface tension γ was set to 0.48 N/m, and the contact angle θ was set to 130°. The pore diameter D corresponding to the peak of the plot was read as the pore diameter Dp.

Then, the volumes of all the pores of which the pore diameters D were 3 nm or more 5.5 μm or less were integrated to calculate the first integrated volume. In addition, the volumes of the pores of which the pore diameters D were 90 nm or more were integrated to calculate the third integrated volume. The third integrated volume was divided by the first integrated volume and the divided value was multiplied by 100 to calculate percentage R (L) of the third integrated volume to the first integrated volume. The volumes of the pores of which the pore diameters D were 50 nm or less were integrated to calculate the second integrated volume. Then, the second integrated volume was divided by the first integrated volume and the divided value was multiplied by 100 to calculate percentage R (S) of the second integrated volume to the first integrated volume. Further, the area and thickness of the electrode catalyst layer used for the measurement of the pore volume Vp were multiplied together to calculate a volume V0 of the electrode catalyst layer. Then, percentage V/V0 of the first integrated volume V to the volume V0 of the electrode catalyst layer was calculated.

(Cross-Section Observation by SEM)

Figure 3A:
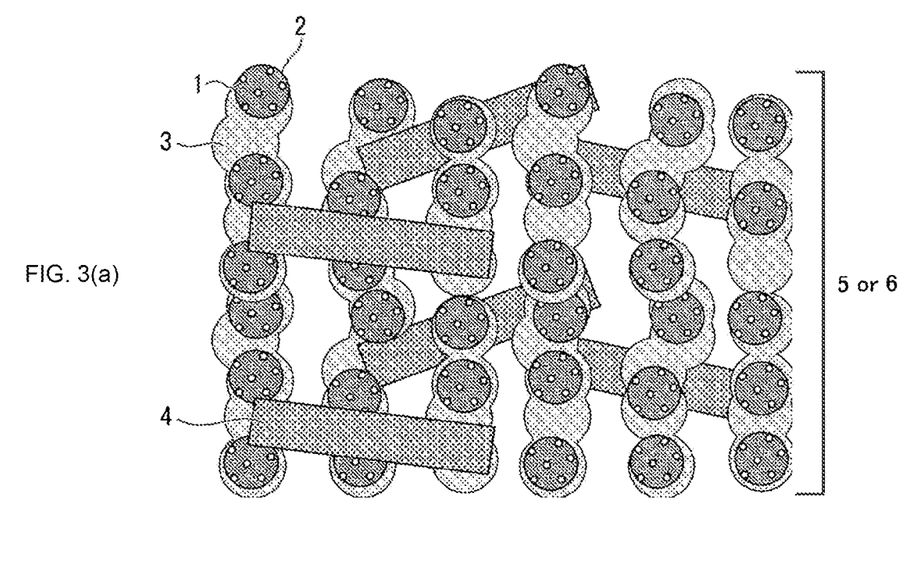
FIGS. 3A and 3B are explanatory cross-sectional views of internal structures of catalyst layers in examples and comparative examples.
Figure 3B:
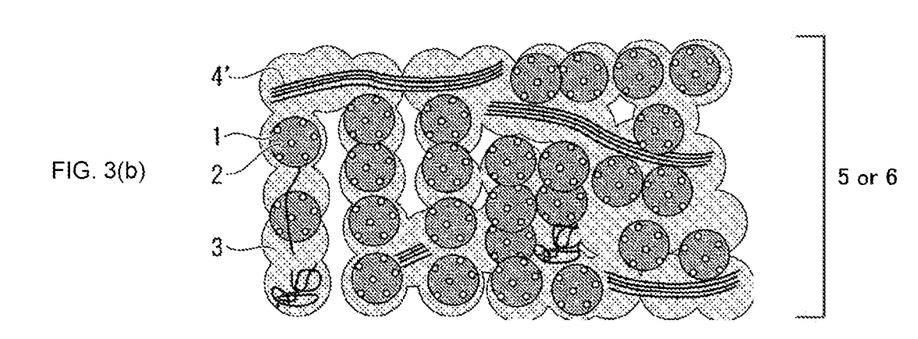

The cross sections of the anode catalyst layers and cathode catalyst layers produced in the Examples 1 to 15 and the comparative examples 1 to 3 described later were observed by SEM. FIGS. 3A and 3B are schematic views of obtained SEM images.

Example 1

A membrane-electrode assembly was produced by coating a cathode catalyst layer with cathode catalyst ink containing a fibrous material of which the specific surface area was 40 m$^2$/g (average fiber length: 10.0 μm, and average fiber diameter: 50 nm) such that the amount of platinum supported by the cathode catalyst layer was 0.3 mg/cm$^2$.

Example 2

A membrane-electrode assembly was produced by coating a cathode catalyst layer with cathode catalyst ink containing a fibrous material of which the specific surface area was 55 m$^2$/g (average fiber length: 7.0 μm, and average fiber diameter: 70 nm) such that the amount of platinum supported by the cathode catalyst layer was 0.3 mg/cm$^2$.

Example 3

A membrane-electrode assembly was produced by coating a cathode catalyst layer with cathode catalyst ink containing a fibrous material of which the specific surface area was 80 m$^2$/g (average fiber length: 5.0 μm, and average fiber diameter: 50 nm) such that the amount of platinum supported by the cathode catalyst layer was 0.3 mg/cm$^2$.

Example 4

A membrane-electrode assembly was produced by coating a cathode catalyst layer with cathode catalyst ink containing a fibrous material of which the specific surface area was 40 m$^2$/g (average fiber length: 2.5 μm, and average fiber diameter: 45 nm) such that the amount of platinum supported by the cathode catalyst layer was 0.3 mg/cm$^2$.

Example 5

A membrane-electrode assembly was produced by coating a cathode catalyst layer with cathode catalyst ink containing a fibrous material of which the specific surface area was 40 m$^2$/g (average fiber length: 12 μm, and average fiber diameter: 300 nm) such that the amount of platinum supported by the cathode catalyst layer was 0.3 mg/cm$^2$.

Example 6

A membrane-electrode assembly was produced by coating a cathode catalyst layer with cathode catalyst ink containing a fibrous material of which the specific surface area was 80 m²/g (average fiber length: 2.5 μm, and average fiber diameter: 45 nm) such that the amount of platinum supported by the cathode catalyst layer was 0.3 mg/cm².

Example 7

A membrane-electrode assembly was produced by coating a cathode catalyst layer with cathode catalyst ink containing a fibrous material of which the specific surface area was 80 m²/g (average fiber length: 12 μm, and average fiber diameter: 300 nm) such that the amount of platinum supported by the cathode catalyst layer was 0.3 mg/cm².

Example 8

A membrane-electrode assembly was produced by coating a cathode catalyst layer with cathode catalyst ink containing a fibrous material of which the specific surface area was 40 m²/g (average fiber length: 3 μm, and average fiber diameter: 45 nm) such that the amount of platinum supported by the cathode catalyst layer was 0.3 mg/cm².

Example 9

A membrane-electrode assembly was produced by coating a cathode catalyst layer with cathode catalyst ink containing a fibrous material of which the specific surface area was 40 m²/g (average fiber length: 20 μm, and average fiber diameter: 30 nm) such that the amount of platinum supported by the cathode catalyst layer was 0.3 mg/cm².

Example 10

A membrane-electrode assembly was produced by coating a cathode catalyst layer with cathode catalyst ink containing a fibrous material of which the specific surface area was 80 m²/g (average fiber length: 3 μm, and average fiber diameter: 45 nm) such that the amount of platinum supported by the cathode catalyst layer was 0.3 mg/cm².

Example 11

A membrane-electrode assembly was produced by coating a cathode catalyst layer with cathode catalyst ink containing a fibrous material of which the specific surface area was 80 m²/g (average fiber length: 12 μm, and average fiber diameter: 300 nm) such that the amount of platinum supported by the cathode catalyst layer was 0.3 mg/cm².

Example 12

A membrane-electrode assembly was produced by coating a cathode catalyst layer with cathode catalyst ink containing a fibrous material of which the specific surface area was 40 m²/g (average fiber length: 12 μm, and average fiber diameter: 500 nm) such that the amount of platinum supported by the cathode catalyst layer was 0.3 mg/cm².

Example 13

A membrane-electrode assembly was produced by coating a cathode catalyst layer with cathode catalyst ink containing a fibrous material of which the specific surface area was 40 m²/g (average fiber length: 12 μm, and average fiber diameter: 400 nm) such that the amount of platinum supported by the cathode catalyst layer was 0.3 mg/cm².

Example 14

A membrane-electrode assembly was produced by coating a cathode catalyst layer with cathode catalyst ink containing a fibrous material of which the specific surface area was 40 m²/g (average fiber length: 2.5 μm, and average fiber diameter: 50 nm) such that the amount of platinum supported by the cathode catalyst layer was 0.3 mg/cm².

Example 15

A membrane-electrode assembly was produced by coating a cathode catalyst layer with cathode catalyst ink containing a fibrous material of which the specific surface area was 80 m²/g (average fiber length: 12 μm, and average fiber diameter: 500 nm) such that the amount of platinum supported by the cathode catalyst layer was 0.3 mg/cm².

Comparative Example 1

A membrane-electrode assembly was produced by coating a cathode catalyst layer with cathode catalyst ink containing a fibrous material of which the specific surface area was 250 m²/g such that the amount of platinum supported by the cathode catalyst layer was 0.3 mg/cm².

Comparative Example 2

A membrane-electrode assembly was produced by coating a cathode catalyst layer with cathode catalyst ink containing a fibrous material of which the specific surface area was 300 m²/g such that the amount of platinum supported by the cathode catalyst layer was 0.3 mg/cm².

Comparative Example 3

A membrane-electrode assembly was produced by coating a cathode catalyst layer with cathode catalyst ink containing a fibrous material of which the specific surface area was 800 m²/g such that the amount of platinum supported by the cathode catalyst layer was 0.3 mg/cm².

(Evaluation Results)

FIGS. 3A and 3B and Table 1 collectively illustrate the evaluation results of examples 1 to 15 and comparative examples 1 to 3. As schematically illustrated in FIG. 3B, in comparative examples 1 to 3, a fibrous material 4' was entangled with the polymer electrolyte 3 and narrowed the pores in the catalyst layer. In contrast, as schematically illustrated in FIG. 3A, in examples 1 to 15, the fibrous material 4 did not become entangled with the polymer electrolyte 3 but secured larger pores than those in the conventional catalyst layer.

The examples 1 to 15 and the comparative examples 1 to 3 supported a constant amount of platinum of 0.3 mg/cm² and were measured under the identical conditions except that examples 1 to 15 had the specific surface area of 40 to 80 m² and comparative examples 1 to 3 had the specific surface area of 250 to 800 m²/g. That is, at least with this amount of supported platinum, the outputs of the examples with the specific surface area of the catalyst layer of 40 to 80 m²/g were 810 to 850 mW/cm², and the outputs of the comparative examples with the specific surface area of the catalyst layer of 250 to 800 m²/g were 638 to 724 mW/cm². If an output is 800 mW/cm² or more, it can be determined that the power generation performance in a high-output region (high current-density region) is improved (that is, the power generation performance in a high-output region is maintained at the level equivalent to that in a low current-density region. The membrane-electrode assemblies in the comparative examples 1 to 3 correspond to the membrane-electrode assemblies according to the conventional techniques.

These results possibly mean that the increases in pore size in the catalyst layer relatively decreased the specific surface area but was effective in the drainage of the water generated in the catalyst layer to the outside. Consequently, it is considered that the high output can be obtained.

TABLE 1

| | Specific surface area [m²/g] | Peak of dVp/dlogD [μm] | Full width at half maximum | Average fiber length [μm] | Average fiber diameter [nm] | Output performance [mW/cm²] |
|---|---|---|---|---|---|---|
| Example 1 | 40 | 0.1 | 0.13 | 10.0 | 50 | 832 |
| Example 2 | 55 | 0.09 | 0.15 | 7.0 | 70 | 850 |
| Example 3 | 80 | 0.06 | 0.18 | 5.0 | 50 | 843 |
| Example 4 | 40 | 0.04 | 0.12 | 2.5 | 45 | 811 |
| Example 5 | 40 | 0.12 | 0.19 | 12.0 | 300 | 818 |
| Example 6 | 80 | 0.04 | 0.12 | 2.5 | 45 | 815 |
| Example 7 | 80 | 0.12 | 0.19 | 12.0 | 300 | 812 |
| Example 8 | 40 | 0.04 | 0.12 | 3.0 | 45 | 810 |
| Example 9 | 40 | 0.12 | 0.19 | 20.0 | 30 | 820 |
| Example 10 | 80 | 0.04 | 0.12 | 3.0 | 45 | 822 |
| Example 11 | 80 | 0.12 | 0.19 | 12.0 | 300 | 826 |
| Example 12 | 40 | 0.04 | 0.12 | 12.0 | 500 | 830 |
| Example 13 | 40 | 0.12 | 0.19 | 12.0 | 400 | 835 |
| Example 14 | 40 | 0.04 | 0.12 | 2.5 | 50 | 831 |
| Example 15 | 80 | 0.12 | 0.19 | 12.0 | 500 | 829 |
| Comparative example 1 | 250 | 0.04 | 0.12 | 1.2 | 10 | 638 |
| Comparative example 2 | 300 | 0.03 | 0.12 | 1.5 | 10 | 661 |

From the above results, according to the present embodiment, the catalyst layer is formed with wider pores than that in conventional catalyst layers, thereby achieving improvement in the power generation performance of the membrane-electrode assembly. Accordingly, adding the fibrous material with an appropriate specific surface area to the catalyst layer makes the pores in the catalyst layer larger in the present embodiment than those in conventional catalyst layers. This activates chemical reaction and improves mass transfer to facilitate the external drainage of water generated in the cathode catalyst layer, thereby suppressing flooding. From the above, according to the catalyst layer in the present embodiment, it is possible to provide a catalyst layer capable of high output and a membrane-electrode assembly including the catalyst layer.

INDUSTRIAL APPLICABILITY

By employing the membrane-electrode assembly according to the present embodiment, sufficient drainage properties and gas permeability can be achieved, and high power generation performance can be provided for a long period.

That is, according to the present embodiment, by containing fibrous material with a specific surface area of 40 m²/g or more and 80 m²/g or less in the catalyst layer, it is possible to provide an electrode catalyst layer that has sufficient drainage properties and gas permeability in driving a polymer electrolyte fuel cell and can provide high power generation performance for a long period, a membrane-electrode assembly, and a polymer electrolyte fuel cell. Therefore, the present invention is high in industrial availability and can be suitably used in, for example, stationary cogeneration systems and fuel cell cars that utilize the polymer electrolyte fuel cells.

REFERENCE SIGNS LIST

1 . . . Catalyst particle; 2 . . . Conductive carrier; 3 . . . Polymer electrolyte; 4, 4' . . . Fibrous material; 5 . . . Cathode catalyst layer; 6 . . . Anode catalyst layer; 7 . . . Polymer electrolyte membrane; 8 . . . Gasket material; 9 . . . Gas diffusion layer.

What is claimed is:

1. A catalyst layer used for a membrane-electrode assembly in a polymer electrolyte fuel cell, wherein
the catalyst layer includes a catalyst particle, a conductive carrier, a polymer electrolyte, and a fibrous material,
the fibrous material includes at least one of an electron conductor or a proton conductor, and the fibrous material has a specific surface area in a range of 40 m²/g or more and 80 m²/g or less,
the catalyst layer has a peak Dp of a distribution function dVp/d log D of a pore volume Vp to a pore diameter D in the catalyst layer, in a range of 0.06 μm or more and 0.10 μm or less,
the catalyst layer has a full width at half maximum at the peak Dp of the distribution function dVp/d log D, in a range of 0.13 μm or more and 0.18 μm or less, and
the catalyst layer has an average fiber length of the fibrous material in a range of 5 μm or more and 10 μm or less.

2. The catalyst layer of claim 1, wherein the catalyst layer has an average fiber diameter of the fibrous material in a range of 50 nm or more and 400 nm or less.

* * * * *